US011177839B2

United States Patent
Hong

(10) Patent No.: US 11,177,839 B2
(45) Date of Patent: Nov. 16, 2021

(54) ANTENNA ADJUSTMENT METHOD, APPARATUS AND TERMINAL DEVICE

(71) Applicant: QUECLINK WIRELESS SOLUTIONS CO., LTD., Shanghai (CN)

(72) Inventor: Fangshao Hong, Shanghai (CN)

(73) Assignee: QUECLINK WIRELESS SOLUTIONS CO., LTD., Shanghai (CN)

(*) Notice: Subject to any disclaimer, the term of this patent is extended or adjusted under 35 U.S.C. 154(b) by 0 days.

(21) Appl. No.: 16/730,764

(22) Filed: Dec. 30, 2019

(65) Prior Publication Data
US 2021/0152194 A1 May 20, 2021

(30) Foreign Application Priority Data
Nov. 15, 2019 (CN) .......................... 201911122145.8

(51) Int. Cl.
*H04M 1/00* (2006.01)
*H04B 1/00* (2006.01)
(Continued)

(52) U.S. Cl.
CPC .............. *H04B 1/0064* (2013.01); *H04B 1/44* (2013.01); *H04W 72/044* (2013.01)

(58) Field of Classification Search
CPC ........ H04B 1/0458; H04B 1/18; H04B 1/005; H04B 1/3827; H04B 7/0608; H04B 7/082;
(Continued)

(56) References Cited

U.S. PATENT DOCUMENTS

| 9,318,801 | B2 * | 4/2016 | Judson | H01Q 9/16 |
| 9,584,091 | B2 * | 2/2017 | Peng | H03H 7/38 |
| 2008/0191951 | A1 * | 8/2008 | Kato | G06K 19/0723 343/722 |

FOREIGN PATENT DOCUMENTS

| CN | 103546178 A | 1/2014 |
| CN | 107566554 A | 1/2018 |

(Continued)

OTHER PUBLICATIONS

The first OA of CN application No. 2019111221458.

*Primary Examiner* — Nhan T Le
(74) *Attorney, Agent, or Firm* — J.C. Patents

(57) ABSTRACT

Provided are an antenna adjustment method, apparatus, and terminal device. The method is applied to a terminal device provided with an antenna, a first feed point, a wireless communication module, and at least two antenna matches, and includes: obtaining a current antenna match connected to the terminal device; determining a communication frequency band in which the terminal device operates; judging whether the communication frequency band corresponds to the current antenna match; determining a target antenna match corresponding to the communication frequency band from the at least two antenna matches if the communication frequency band does not correspond to the current antenna match; and adjusting the antenna according to the target antenna match to cause the antenna to support the communication frequency band, wherein the antenna is connected to a signal transmitting and receiving interface of the wireless communication module through the first feed point to perform signal reception or transmission.

17 Claims, 6 Drawing Sheets

(51) Int. Cl.
*H04B 1/44* (2006.01)
*H04W 72/04* (2009.01)

(58) Field of Classification Search
CPC .......... H04B 1/50; H04B 1/0064; H04B 1/04;
H04B 1/0053; H04B 1/40; H04B 7/0814;
H04B 1/44; H04W 88/02; H04W 72/044
See application file for complete search history.

(56) References Cited

FOREIGN PATENT DOCUMENTS

| | | | |
|---|---|---|---|
| EP | 3364543 | B1 | 8/2018 |
| KR | 102019110 | B1 | 11/2019 |

\* cited by examiner

ANTENNA ADJUSTMENT METHOD, APPARATUS AND TERMINAL DEVICE

CROSS-REFERENCE TO RELATED APPLICATION

This application claims priority to Chinese Patent Application No. 201911122145.8, filed on Nov. 15, 2019, which is hereby incorporated by reference in its entirety.

TECHNICAL FIELD

Embodiments of the present disclosure relate to the field of communications technologies, and in particular, to an antenna adjustment method, apparatus, and terminal device.

BACKGROUND

With the development of communication technologies, the range of frequency used in communication is getting wider and wider. For a communication terminal device, space and layout of an antenna are limited, so frequencies supported by the antenna cannot meet all available communication frequencies.

In the existing antenna frequency self-tuning technology, some terminal devices are directly designed using a communication chip. The communication chip can obtain a communication frequency band in which the terminal device operates in advance, and has a dedicated radio frequency control port to output frequency band state information in time. When setting the antenna of the terminal device, by controlling a reserved antenna tuning circuit, an operating frequency range of the antenna covers the above-mentioned communication frequency band to meet the communication requirements.

However, for many products, for example: products designed with third-party communication modules, network search and network registration are implemented on the physical layer driver side of the chip provider, and upper-layer applications of the products cannot obtain in advance. Therefore, if the terminal device uses such architecture design, it will not be possible to determine the communication frequency band in which the terminal device operates in advance. In this case, the antenna of the terminal device may not be able to support the communication frequency band actually used and cannot meet the communication requirements.

SUMMARY

Embodiments of the present disclosure provide an antenna adjustment method, apparatus, and terminal device to overcome the problem that the antenna cannot support the communication frequency band actually used when the communication frequency band in which the terminal device operates cannot be determined in advance, resulting in a failure to meet communication requirements.

In a first aspect, an embodiment of the present disclosure provides an antenna adjustment method, which is applied to a terminal device, where the terminal device is provided with an antenna, a first feed point, a wireless communication module, and at least two antenna matches, and different antenna matches correspond to different operating frequency bands, and where the method includes:

obtaining a current antenna match connected to the terminal device;

determining a communication frequency band in which the terminal device operates;

judging whether the communication frequency band corresponds to the current antenna match;

determining a target antenna match corresponding to the communication frequency band from the at least two antenna matches if the communication frequency band does not correspond to the current antenna match; and adjusting the antenna according to the target antenna match to cause the antenna to support the communication frequency band, where the antenna is connected to a signal transmitting and receiving interface of the wireless communication module through the first feed point to perform signal reception or transmission.

In a possible design, the determining a communication frequency band in which the terminal device operates includes:

obtaining a network to which the terminal device is registered; and determining a communication frequency band corresponding to the network to which the terminal device is registered according a pre-stored correspondence relationship between networks and communication frequency bands, and taking the determined communication frequency band as the communication frequency band in which the terminal device operates.

In a possible design, the judging whether the communication frequency band corresponds to the current antenna match includes:

obtaining an operating frequency band corresponding to the current antenna match;

judging whether the operating frequency band corresponding to the current antenna match covers the communication frequency band; and determining that the communication frequency band corresponds to the current antenna match if the operating frequency band corresponding to the current antenna match covers the communication frequency band.

In a possible design, the determining a target antenna match corresponding to the communication frequency band includes:

obtaining a correspondence relationship between frequency bands and antenna matches that is pre-stored in the wireless communication module; and determining the target antenna match corresponding to the communication frequency band from the at least two antenna matches according to the correspondence relationship.

In a possible design, the adjusting the antenna according to the target antenna match includes:

switching the current antenna match to the target antenna match to adjust an impedance of the antenna.

In a possible design, the terminal device is further provided with a second feed point and a radio frequency switch; the antenna is connected to the radio frequency switch through the second feed point, and the radio frequency switch is connected to the at least two antenna matches;

the switching the current antenna match to the target antenna match to adjust an impedance of the antenna includes:

controlling the radio frequency switch through a general-purpose input/output (GPIO) of the wireless communication module to cause the second feed point to be connected to the target antenna match to adjust the impedance of the antenna.

In a second aspect, an embodiment of the present disclosure provides an antenna adjustment apparatus, which is applied to a terminal device, where the terminal device is provided with an antenna, a first feed point, a wireless communication module, and at least two antenna matches, and different antenna matches correspond to different operating frequency bands, and where the apparatus includes:

an obtaining module, configured to obtain a current antenna match connected to the terminal device;

a determining module, configured to determine a communication frequency band in which the terminal device operates;

a judging module, configured to judge whether the communication frequency band corresponds to the current antenna match;

a processing module configured to determine a target antenna match corresponding to the communication frequency band from the at least two antenna matches if the communication frequency band does not correspond to the current antenna match; and an adjusting module, configured to adjust the antenna according to the target antenna match to cause the antenna to support the communication frequency band, where the antenna is connected to a signal transmitting and receiving interface of the wireless communication module through the first feed point to perform signal reception or transmission.

In a possible design, the determining module is specifically configured to:

obtain a network to which the terminal device is registered; and determine a communication frequency band corresponding to the network to which the terminal device is registered according a pre-stored correspondence relationship between networks and communication frequency bands, and taking the determined communication frequency band as the communication frequency band in which the terminal device operates.

In a possible design, the judging module is specifically configured to:

obtain an operating frequency band corresponding to the current antenna match;

judge whether the operating frequency band corresponding to the current antenna match covers the communication frequency band; and determine that the communication frequency band corresponds to the current antenna match if the operating frequency band corresponding to the current antenna match covers the communication frequency band.

In a possible design, the processing module includes a corresponding sub-module and a matching sub-module;

the corresponding sub-module is configured to obtain a correspondence relationship between frequency bands and antenna matches that is pre-stored in the wireless communication module if the communication frequency band does not correspond to the current antenna match; and the match sub-module is configured to determine the target antenna match corresponding to the communication frequency band from the at least two antenna matches according to the correspondence relationship.

In a possible design, the adjusting module is specifically configured to:

switch the current antenna match to the target antenna match to adjust an impedance of the antenna.

In a possible design, the terminal device is further provided with a second feed point and a radio frequency switch; the antenna is connected to the radio frequency switch through the second feed point, and the radio frequency switch is connected to the at least two antenna matches;

the adjusting module switching the current antenna match to the target antenna match to adjust an impedance of the antenna includes:

controlling the radio frequency switch through a GPIO of the wireless communication module to cause the second feed point to be connected to the target antenna match to adjust the impedance of the antenna.

According to a third aspect, an embodiment of the present disclosure provides a terminal device, including: an antenna, a first feed point, a wireless communication module, at least two antenna matches and a processor; where different antenna matches correspond to different operating frequency bands;

the antenna is connected to a signal transmitting and receiving interface of the wireless communication module through the first feed point to perform signal reception or transmission;

the processor is configured to obtain a current antenna match connected to the terminal device; determine a communication frequency band in which the terminal device operates; judge whether the communication frequency band corresponds to the current antenna match; determine a target antenna match corresponding to the communication frequency band from the at least two antenna matches if the communication frequency band does not correspond to the current antenna match; and adjust the antenna according to the target antenna match to cause the antenna to support the communication frequency band.

In a possible design, the processor determining the communication frequency band in which the terminal device operates includes:

obtaining a network to which the terminal device is registered; and determining a communication frequency band corresponding to the network to which the terminal device is registered according a pre-stored correspondence relationship between networks and communication frequency bands, and taking the determined communication frequency band as the communication frequency band in which the terminal device operates.

In a possible design, the processor judging whether the communication frequency band corresponds to the current antenna match includes:

obtaining an operating frequency band corresponding to the current antenna match;

judging whether the operating frequency band corresponding to the current antenna match covers the communication frequency band; and determining that the communication frequency band corresponds to the current antenna match if the operating frequency band corresponding to the current antenna match covers the communication frequency band.

In a possible design, the wireless communication module is pre-stored with a correspondence relationship between frequency bands and antenna matches, and different antenna matches correspond to different frequency bands;

the processor determining the target antenna match corresponding to the communication frequency band includes:

obtaining the correspondence relationship between frequency bands and antenna matches that is pre-stored in the wireless communication module; and determining the target antenna match corresponding to the communication frequency band from the at least two antenna matches according to the correspondence relationship.

In a possible design, the processor adjusting the antenna according to the target antenna match includes:

switching the current antenna match to the target antenna match to adjust an impedance of the antenna.

In a possible design, the terminal device further includes: a radio frequency switch and a second feed point; where the antenna is connected to the radio frequency switch through the second feed point, and the radio frequency switch is connected to the at least two antenna matches;

the processor switching the current antenna match to the target antenna match to adjust an impedance of the antenna includes:

controlling the radio frequency switch through a GPIO of the wireless communication module to cause the second feed point to be connected to the target antenna match to adjust the impedance of the antenna.

According to a fourth aspect, an embodiment of the present disclosure provides an antenna adjustment device, including: at least one processor and a memory; where the memory stores computer execution instructions;

the at least one processor executes the computer execution instructions stored in the memory to cause the at least one processor to execute the antenna adjustment method according to the above first aspect and various possible designs of the first aspect.

In a fifth aspect, an embodiment of the present disclosure provides a computer-readable storage medium, where the computer-readable storage medium is stored therein computer execution instructions, which, when executed by the processor, implement the antenna adjustment method according to the above first aspect and various possible designs of the first aspect.

In the antenna adjustment method, apparatus and terminal device provided by the embodiments of the present disclosure, the antenna is connected with at least two antenna matches, and each antenna match corresponds to a different operating frequency band. In the method, the antenna first enables the terminal device to perform network registration through a current antenna match, and obtaining a current antenna match connected to the terminal device and a communication frequency band in which the terminal device operates; judging whether the communication frequency band corresponds to the current antenna match; determining a target antenna match corresponding to the communication frequency band if the communication frequency band does not correspond to the current antenna; and adjusting the antenna according to the target antenna match, so that the antenna is adjusted to a state that can support a communication frequency band actually used by the terminal device, thereby avoiding a problem that communication requirements cannot be met caused due to that the antenna cannot support the communication frequency band actually used.

BRIEF DESCRIPTION OF DRAWINGS

In order to more clearly explain the technical solutions in the embodiments of the present disclosure or the prior art, the drawings used in the description of the embodiments or the prior art will be briefly introduced below. Obviously, the drawings in the following description are some embodiments of the present disclosure. For those skilled in the art, other drawings can be obtained based on these drawings without paying any creative efforts.

DESCRIPTION OF EMBODIMENTS

In order to make the objects, technical solutions, and advantages of the embodiments of the present disclosure clearer, the technical solutions in the embodiments of the present disclosure will be clearly and completely described with reference to the accompanying drawings in the embodiments of the present disclosure. Obviously, the described embodiments are a part, but not all, of the embodiments of the present disclosure. Based on the embodiments of the present disclosure, all other embodiments obtained by those skilled in the art without paying any creative efforts shall fall within the protection scope of the present disclosure.

In the existing antenna frequency self-tuning technology, some terminal devices are directly designed using a communication chip. The communication chip can obtain a communication frequency band in which the terminal device operates in advance, and has a dedicated radio frequency control port to output frequency band state information in time. When setting the antenna of the terminal device, by controlling a reserved antenna tuning circuit, an operating frequency range of the antenna covers the above-mentioned communication frequency band to meet the communication requirements.

However, for many products, for example: products designed with third-party communication modules, the actual operating networking cannot be known in advance. Therefore, if the terminal device uses such architecture design, it will not be possible to determine the communication frequency band in which the terminal device operates in advance. In this case, the antenna of the terminal device may not be able to support the communication frequency band actually used and cannot meet the communication requirements.

Therefore, in view of the above problems, an embodiment provides an antenna adjustment method, which, by obtaining a current antenna match connected to a terminal device; determining a communication frequency band in which the terminal device operates; judging whether the communication frequency band corresponds to the current antenna match; determining a target antenna match corresponding to the communication frequency band if the communication frequency band does not correspond to the current antenna match; and adjusting the antenna according to the target antenna match, enables the antenna to be adjusted to a state that can support a communication frequency band actually used by the terminal device, thereby avoiding a problem that the antenna cannot meet communication requirements caused due to that the antenna cannot support the communication frequency band actually used.

Figure 1:
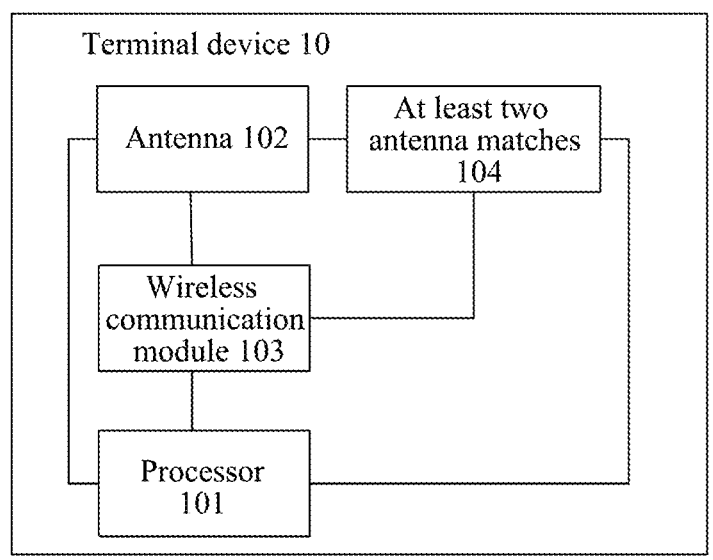
FIG. 1 is a schematic architecture diagram of an antenna adjustment system according to an embodiment of the present disclosure.

The antenna adjustment method provided by the embodiment is applicable to a schematic architecture diagram of an antenna adjustment system according to an embodiment of the present disclosure shown in FIG. 1. As shown in FIG. 1, the system provided by the embodiment includes a terminal device 10, and the terminal device 10 is provided with a processor 101, an antenna 102, a first feeding point (not shown in FIG. 1), a wireless communication module 103, and at least two antenna matches 104. The processor 101 can obtain a current antenna match connected to the terminal device; can determine a communication frequency band in which the terminal device operates; can judge whether the communication frequency band corresponds to the current antenna match; can also determine a target antenna match corresponding to the communication frequency band from the at least two antenna matches 104 if the communication frequency band does not correspond to the current antenna match; can further adjust the antenna 102 according to the target antenna match to cause the antenna 102 to support the above-mentioned communication frequency band. The antenna 102 is connected to a signal transmitting and receiving interface of the wireless communication module 103 through the first feed point to perform signal reception or transmission. The implementation manner of the terminal device is not particularly limited in the embodiment, and may be a mobile phone, a tablet, or the like. The above communication frequency band is a frequency band used in an actual communication process of the terminal device. There are at least two antenna matches, and each antenna match corresponds to a different operating frequency band; the specific number of antenna matches can be set according to the actual application, which is not particularly limited in the embodiment. A ground point (not shown in FIG. 1) may also be set on the terminal device 10 according to actual requirements.

The following specifically describes the technical solutions of the present disclosure and how the technical solutions of the present disclosure solve the foregoing technical problems by using specific embodiments. The following specific embodiments may be combined with each other, and the same or similar concepts or processes may not be repeated in some embodiments. The embodiments of the present disclosure will be described below with reference to the drawings.

Figure 2:
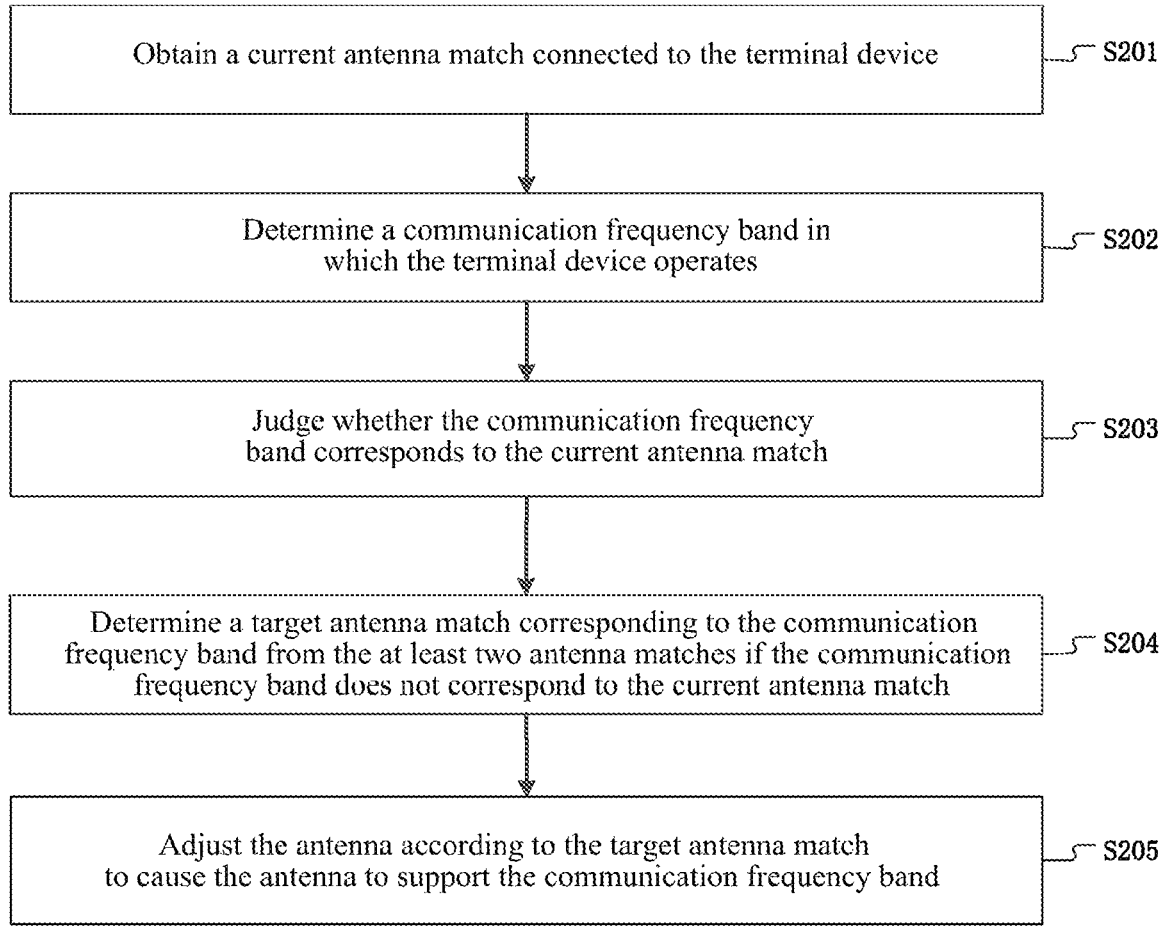
FIG. 2 is a first schematic flowchart of an antenna adjustment method according to an embodiment of the present disclosure.

FIG. 2 is a first schematic flowchart of an antenna adjustment method according to an embodiment of the present disclosure. An executive entity of the embodiment may be the processor 101 in the embodiment shown in FIG. 1. The embodiment of the present disclosure is applied to a terminal device, where the terminal device is provided with a first feed point, a wireless communication module, and at least two antennas to match, and different antenna matches correspond to different operating frequency bands. As shown in FIG. 2, the method may include:

S201: acquire a current antenna match connected to the terminal device;

The antenna match can adjust an impedance of the antenna, and the impedance of the antenna reflects a power transmission relationship between an input circuit and an output circuit.

Exemplarily, taking the terminal device being an executive entity as an example, before determining the communication frequency band in which the terminal device operates, the antenna in the terminal device may be connected to the current antenna match. The current antenna match can be a default antenna match set at the factory.

S202: determine a communication frequency band in which the terminal device operates.

The communication frequency band in which the terminal device operates is a frequency band used by the terminal device in a current communication process.

The determining a communication frequency band in which the terminal device operates may be implemented by, but not limited to, the following manner:

obtain a network to which the terminal device is registered; and determine a communication frequency band corresponding to the network to which the terminal device is registered according a pre-stored correspondence relationship between networks and communication frequency bands, and take the determined communication frequency band as the communication frequency band in which the terminal device operates.

The registered network may be a registered communication network, such as an operator network.

The pre-stored correspondence relationship between networks and communication frequency bands may include: a correspondence relationship between each network of the communication networks and a communication frequency band of that network.

Exemplarily, the network to which the terminal device is registered is obtained, for example, the terminal device is registered to network A, then a communication frequency band corresponding to the network A is searched according to the pre-stored correspondence relationship between networks and communication frequency bands.

Through the network to which the terminal device is registered, the communication frequency band in which the terminal device operates can be accurately determined.

S203: judge whether the communication frequency band corresponds to the current antenna match.

The judging whether the communication frequency band corresponds to the current antenna match may be implemented by, but not limited to, the following manner:

obtain an operating frequency band corresponding to the current antenna match;

judge whether the operating frequency band corresponding to the current antenna match covers the communication frequency band; and determine that the communication frequency band corresponds to the current antenna match if the operating frequency band corresponding to the current antenna match covers the communication frequency band.

Exemplarily, if the operating frequency band corresponding to the current antenna match covers the communication frequency band, it means that the antenna can support the current communication frequency band at this time, and the communication frequency band corresponds to the current antenna match.

S204: determine a target antenna match corresponding to the communication frequency band from the at least two antenna matches if the communication frequency band does not correspond to the current antenna match.

Exemplarily, when the antenna match corresponds to the communication frequency band, the antenna can more effectively support the communication frequency band. If the communication frequency band does not correspond to the current antenna match, it means that the antenna cannot currently achieve impedance match. The impedance match is a common operating state in radio technology. The impedance of the antenna reflects the power transmission relationship between the input circuit and the output circuit. When the circuit achieves the impedance match, that is, the antenna match corresponds to the communication frequency band, a maximum transmission efficiency is achieved. At this time, the target antenna match corresponding to the communication frequency band needs to be determined.

S205: adjust the antenna according to the target antenna match to cause the antenna to support the communication frequency band.

The antenna is connected to a signal transmitting and receiving interface of the wireless communication module through the first feed point to perform signal reception or transmission.

The adjusting the antenna according to the target antenna match may be implemented by, but not limited to, the following manner:

switch the current antenna match to the target antenna match to adjust an impedance of the antenna.

Exemplarily, the current antenna match is antenna match 1, the target antenna match corresponding to the communication frequency band is antenna match 2, and the antenna match 1 is switched to the antenna match 2 to adjust the impedance of the antenna.

In an embodiment, the terminal device is further provided with a second feed point and a radio frequency switch; the antenna is connected to the radio frequency switch through the second feed point, and the radio frequency switch is connected to the at least two antenna matches.

In an embodiment, the switching the current antenna match to the target antenna match to adjust an impedance of the antenna includes:

control the radio frequency switch through a GPIO of the wireless communication module to cause the second feed point to be connected to the target antenna match to adjust the impedance of the antenna.

Exemplarily, the second feed point is connected to multiple antenna matches corresponding to different operating frequency bands through the radio frequency switch, and the radio frequency switch is controlled by the GPIO of the wireless communication module, which may cause the second feed point to be connected to the target antenna match through the radio frequency switch, thereby adjusting the impedance of the antenna, thereby enabling the antenna to be adjusted to a state that can support a communication frequency band actually used by the terminal device.

In the embodiment of the present application, the second feed point is connected to at least two antennas tuning matches through the radio frequency switch. A control signal of the radio frequency switch can be a dedicated radio frequency control port or a GPIO. However, the prior art can only use the dedicated radio frequency control port. Therefore, the control manner of the antenna adjustment method provided by the embodiment of the present application is different from the prior art, and can be applied to a terminal device that cannot use the dedicated radio frequency control port.

In the antenna adjustment method provided by the embodiment of the present disclosure, the antenna is connected with at least two antenna matches, and each antenna match corresponds to a different operating frequency band. In the method, the antenna first enables the terminal device to perform network registration through a current antenna match. Then, by obtaining a current antenna match connected to the terminal device, determining a communication frequency band in which the terminal device operates, judging whether the communication frequency band corresponds to the current antenna match, determining a target antenna match corresponding to the communication frequency band if the communication frequency band does not correspond to a default antenna impedance, and adjusting the antenna according to the target antenna match, the antenna using an ordinary GPIO is adjusted to a state that can support a communication frequency band actually used by the terminal device, thereby avoiding a problem that communication requirements cannot be met caused due to that the antenna cannot support the communication frequency band actually used.

Figure 3:
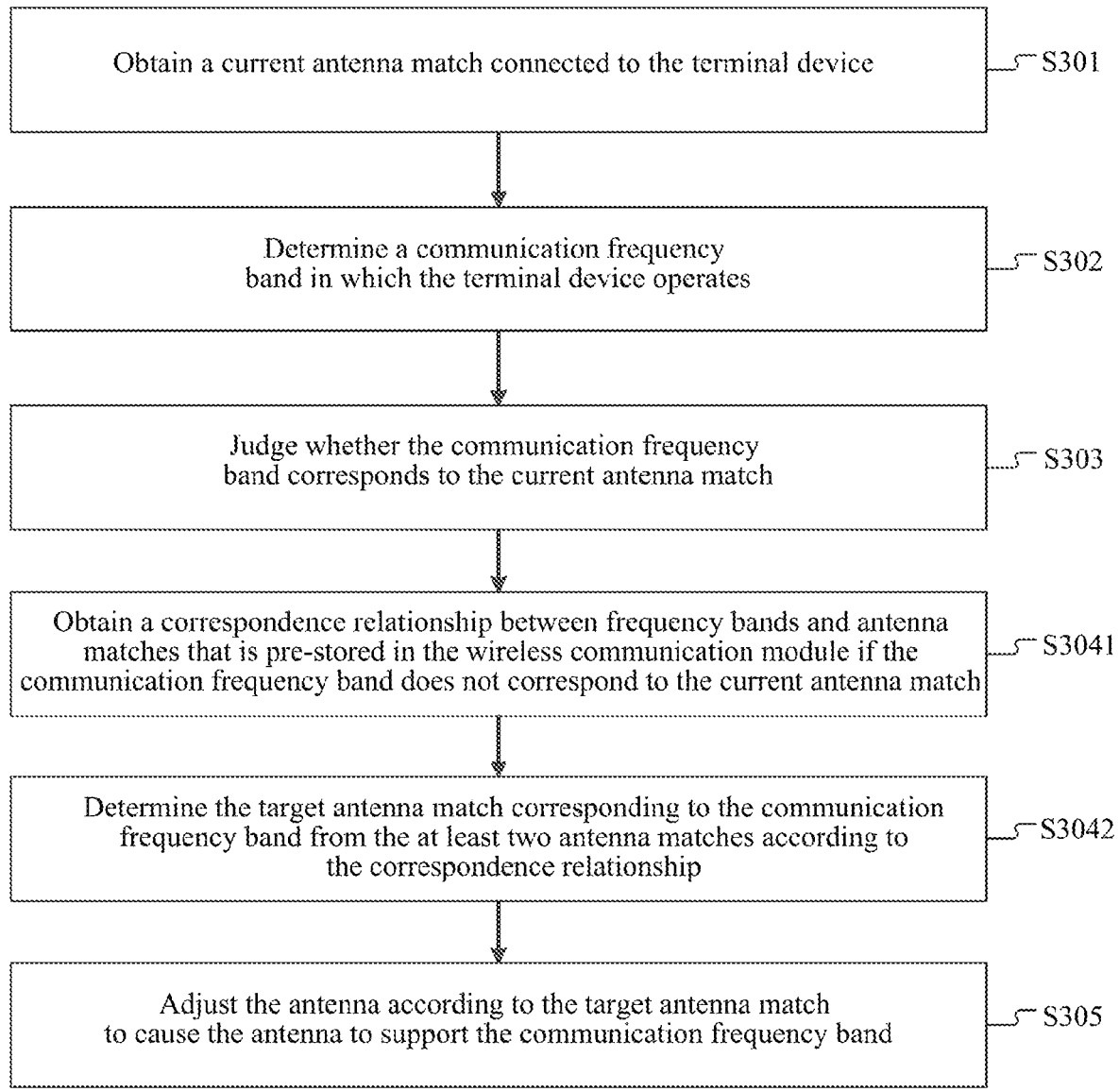
FIG. 3 is a second schematic flowchart of an antenna adjustment method according to an embodiment of the present disclosure.

FIG. 3 is a second schematic flowchart of an antenna adjustment method according to an embodiment of the present disclosure. An executive entity of the embodiment may be the processor 101 in the embodiment shown in FIG. 1. As shown in FIG. 3, the method includes:

S301: obtain a current antenna match connected to the terminal device;

S302: determine a communication frequency band in which the terminal device operates; and S303: judge whether the communication frequency band corresponds to the current antenna match.

Steps S301-S303 are implemented in the same manner as steps S201-S203 described above, and details are not described herein again.

S304: determine a target antenna match corresponding to the communication frequency band if the communication frequency band does not correspond to the current antenna match.

The determining a target antenna match corresponding to the communication frequency band from the at least two antenna matches if the communication frequency band does not correspond to the current antenna match may be achieved by, but not limited to, the following manner:

S3041: obtain a correspondence relationship between frequency bands and antenna matches that is pre-stored in the wireless communication module, if the communication frequency band does not correspond to the current antenna match.

The wireless communication module is pre-stored with the correspondence relationship between frequency bands and antenna matches, and different antenna matches correspond to different frequency bands.

S3042: determine the target antenna match corresponding to the communication frequency band from the at least two antenna matches according to the correspondence relationship.

Exemplarily, the pre-stored correspondence relationship between frequency bands and antenna matches is stored in the wireless communication module. If the communication frequency band does not correspond to the current antenna match, then the above correspondence relationship is obtained from the wireless communication module to find an antenna match corresponding to the communication frequency band. If the communication frequency band corresponds to the antenna match 2 of the at least two antenna matches, then the antenna match 2 is the target antenna match.

By obtaining the pre-stored correspondence relationship between frequency bands and antenna matches, the target antenna match corresponding to the communication frequency band can be accurately determined.

S305: adjust the antenna according to the target antenna match to cause the antenna to support the communication frequency band.

The antenna is connected to a signal transmitting and receiving interface of the wireless communication module through the first feed point to perform signal reception or transmission.

This step S305 is implemented in the same manner as step S205 described above, and details are not described herein again.

In the antenna adjustment method provided by the embodiment of the present disclosure, the antenna is connected with at least two antenna matches, and each antenna match corresponds to a different operating frequency band. In the method, the antenna first enables the terminal device to perform network registration through a current antenna match, and by obtaining a current antenna match connected to the terminal device, determining a communication frequency band in which the terminal device operates, judging whether the communication frequency band corresponds to the current antenna match, obtaining a pre-stored correspondence relationship between frequency bands and antenna matches if the communication frequency band does not correspond to the current antenna match, determining the target antenna match corresponding to the communication frequency band according to the correspondence relationship, and adjusting the antenna according to the target antenna match, the antenna using an ordinary GPIO is adjusted to a state that can support a communication frequency band actually used by the terminal device, thereby avoiding a problem that the antenna cannot meet communication requirements caused due to that the antenna cannot support the communication frequency band actually used. By obtaining the pre-stored correspondence relationship between frequency bands and antenna matches, the target antenna match corresponding to the communication frequency band can be accurately determined.

Figure 4:
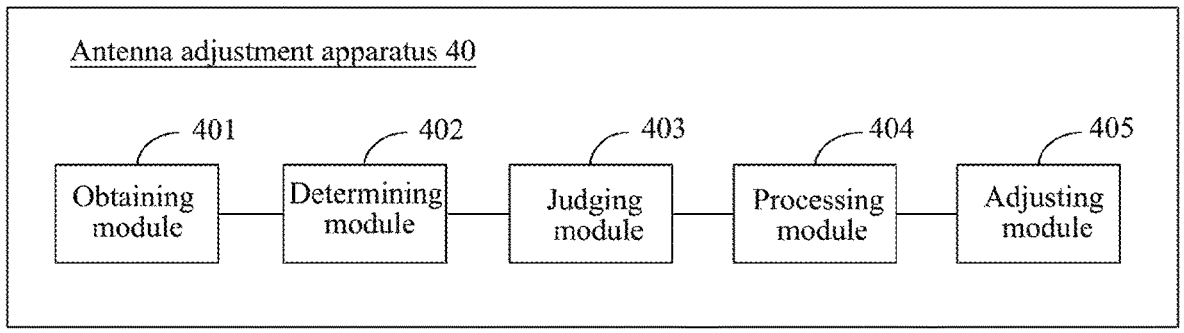
FIG. 4 is a first schematic structural diagram of an antenna adjustment apparatus according to an embodiment of the present disclosure.

Corresponding to the antenna adjustment method of the foregoing embodiments, FIG. 4 is a first schematic structural diagram of an antenna adjustment apparatus according to an embodiment of the present disclosure. For convenience of explanation, only parts related to the embodiment of the present disclosure are shown. The embodiment of the present disclosure is applied to a terminal device. The terminal device is provided with an antenna, a first feed point, a wireless communication module, and at least two antenna matches, and different antenna matches correspond to different operating frequency bands. As shown in FIG. 4, the antenna adjustment apparatus 40 includes: an obtaining module 401, a determining module 402, a judging module 403, a processing module 404, and an adjusting module 405.

The obtaining module 401 is configured to obtain a current antenna match connected to the terminal device;

the determining module 402 is configured to determine a communication frequency band in which the terminal device operates;

the judging module 403 is configured to judge whether the communication frequency band corresponds to the current antenna match;

the processing module 404 is configured to determine a target antenna match corresponding to the communication frequency band from the at least two antenna matches if the communication frequency band does not correspond to the current antenna match; and the adjustment module 405 is configured to adjust the antenna according to the target antenna match to cause the antenna to support the communication frequency band, where the antenna is connected to a signal transmitting and receiving interface of the wireless communication module through the first feed point to perform signal reception or transmission.

The apparatus provided by the embodiment of the present disclosure may be used to implement the technical solutions of the foregoing method embodiments, and the implementation principles and technical effects thereof are similar. The embodiments of the present disclosure are not described herein again.

Figure 5:
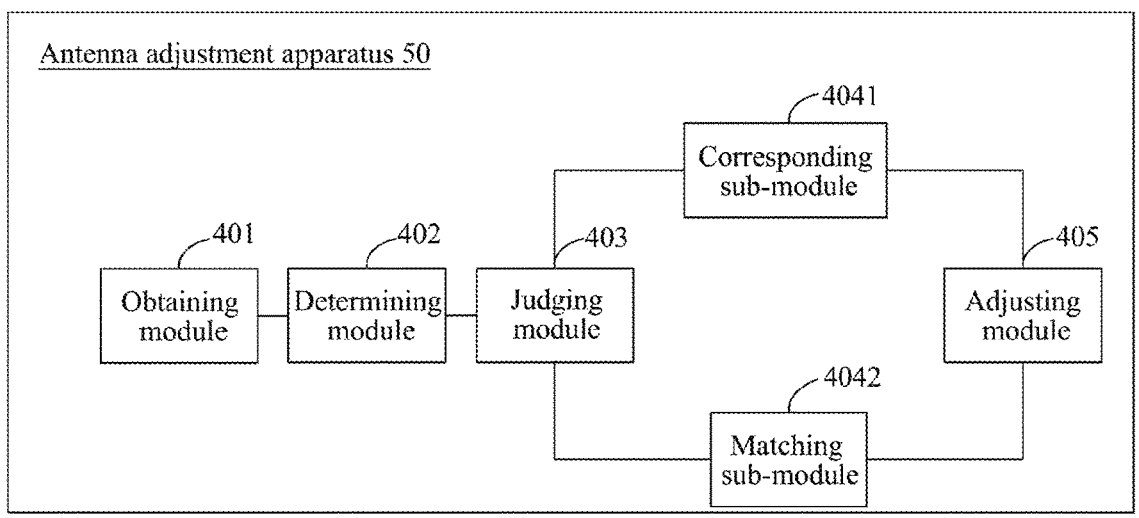
FIG. 5 is a second schematic structural diagram of an antenna adjustment apparatus according to an embodiment of the present disclosure.

FIG. 5 is a second schematic structural diagram of an antenna adjustment apparatus according to an embodiment of the present disclosure. As shown in FIG. 5, the antenna adjustment apparatus 50 is based on FIG. 4, and the processing module 404 includes a corresponding sub-module 4041 and a matching sub-module 4042.

In an embodiment, the determining module 402 is specifically configured to:

obtain a network to which the terminal device is registered; and determine a communication frequency band corresponding to the network to which the terminal device is registered according a pre-stored correspondence relationship between networks and communication frequency bands, and take the determined communication frequency band as the communication frequency band in which the terminal device operates.

In an embodiment, the judging module 403 is specifically configured to:

obtain an operating frequency band corresponding to the current antenna match;

judge whether the operating frequency band corresponding to the current antenna match covers the communication frequency band; and determine that the communication frequency band corresponds to the current antenna match if the operating frequency band corresponding to the current antenna match covers the communication frequency band.

In an embodiment, the wireless communication module is pre-stored with a correspondence relationship between frequency bands and antenna matches, and different antenna matches correspond to different frequency bands;

The corresponding sub-module 4041 is configured to obtain a correspondence relationship between frequency bands and antenna matches that is pre-stored in the wireless communication module if the communication frequency band does not correspond to the current antenna match; and the match sub-module 4042 is configured to determine the target antenna match corresponding to the communication frequency band from the at least two antenna matches according to the correspondence relationship.

In an embodiment, the adjustment module 405 is specifically configured to:

switch the current antenna match to the target antenna match to adjust an impedance of the antenna.

In an embodiment, the terminal device is further provided with a second feed point and a radio frequency switch; the antenna is connected to the radio frequency switch through the second feed point, and the radio frequency switch is connected to the at least two antenna matches;

the adjusting module 405 switching the current antenna match to the target antenna match to adjust an impedance of the antenna includes:

controlling the radio frequency switch through a GPIO of the wireless communication module to cause the second feed point to be connected to the target antenna match to adjust the impedance of the antenna.

The apparatus provided by the embodiment of the present disclosure may be used to implement the technical solutions of the foregoing method embodiments, and the implementation principles and technical effects thereof are similar. The embodiment of the present disclosure are not described herein again.

Figure 6:
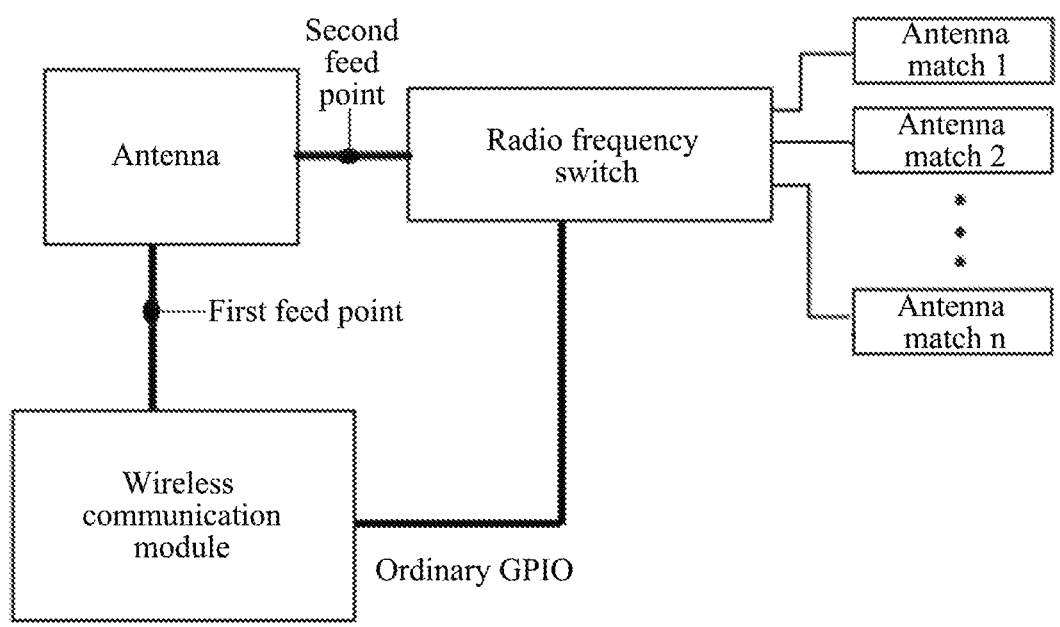
FIG. 6 is a schematic structural diagram of a terminal device according to an embodiment of the present disclosure.

Corresponding to the antenna adjustment methods of the foregoing embodiments, FIG. 6 is a schematic structural diagram of a terminal device according to an embodiment of the present disclosure. For ease of description, only parts related to the embodiment of the present disclosure are shown. As shown in FIG. 6, the terminal device includes: an antenna, a first feed point, a wireless communication module, at least two antenna matches (in the figure, n antenna matches are taken as an example for illustration), and a processor. In an embodiment, it further includes: a second feed point and a radio frequency switch. The wireless communication module controls the radio frequency switch through an ordinary GPIO. In an embodiment, according to actual requirements, the terminal device may further include a ground point (not shown in the figure).

Different antenna matches correspond to different operating frequency bands;

the antenna is connected to a signal transmitting and receiving interface of the wireless communication module through the first feed point to perform signal reception or transmission;

the processor is configured to obtain a current antenna match connected to the terminal device; determine a communication frequency band in which the terminal device operates; judge whether the communication frequency band corresponds to the current antenna match; determine a target antenna match corresponding to the communication frequency band from the at least two antenna matches if the communication frequency band does not correspond to the current antenna match; and adjust the antenna according to the target antenna match to cause the antenna to support the communication frequency band.

In an embodiment, the processor determining the communication frequency band in which the terminal device operates includes:

obtain a network to which the terminal device is registered; and determine a communication frequency band corresponding to the network to which the terminal device is registered according a pre-stored correspondence relationship between networks and communication frequency bands, and take the determined communication frequency band as the communication frequency band in which the terminal device operates.

In an embodiment, the processor judging whether the communication frequency band corresponds to the current antenna match includes:

obtain an operating frequency band corresponding to the current antenna match;

judge whether the operating frequency band corresponding to the current antenna match covers the communication frequency band; and determine that the communication frequency band corresponds to the current antenna match if the operating frequency band corresponding to the current antenna match covers the communication frequency band.

In an embodiment, the wireless communication module is pre-stored with a correspondence relationship between frequency bands and antenna matches, and different antenna matches correspond to different frequency bands;

the processor determining the target antenna match corresponding to the communication frequency band includes:

obtain the correspondence relationship between frequency bands and antenna matches that is pre-stored in the wireless communication module; and determining the target antenna match corresponding to the communication frequency band from the at least two antenna matches according to the correspondence relationship.

In an embodiment, the processor adjusting the antenna according to the target antenna match includes:

switch the current antenna match to the target antenna match to adjust an impedance of the antenna.

In an embodiment, the terminal device further includes: a radio frequency switch and a second feed point; where the antenna is connected to the radio frequency switch through the second feed point, and the radio frequency switch is connected to the at least two antenna matches;

the processor switching the current antenna match to the target antenna match to adjust an impedance of the antenna includes:

control the radio frequency switch through a GPIO of the wireless communication module to cause the second feed point to be connected to the target antenna match to adjust the impedance of the antenna.

In the embodiment of the present application, the second feed point of the terminal device is connected to at least two antennas tuning matches through the radio frequency switch. A control signal of the radio frequency switch can be a dedicated radio frequency control port or a GPIO. However, the terminal device in the prior art can only use the dedicated radio frequency control port. Therefore, the antenna adjustment control manner of the terminal device provided by the embodiment of the present application is different from the prior art, and can be applied to a case where the dedicated radio frequency control port cannot be used, and the radio frequency switch is controlled by the ordinary GPIO of the wireless communication module, which may cause the second feed point to be connected to the target antenna match through the radio frequency switch, thereby adjusting the impedance of the antenna, and enabling the antenna to be adjusted to a state that can support a communication frequency band actually used by the terminal device.

The implementation principles and technical effects of the terminal device provided by the embodiments of the present disclosure are similar to the foregoing method embodiments. The embodiment of the present disclosure are not described herein again.

Figure 7:
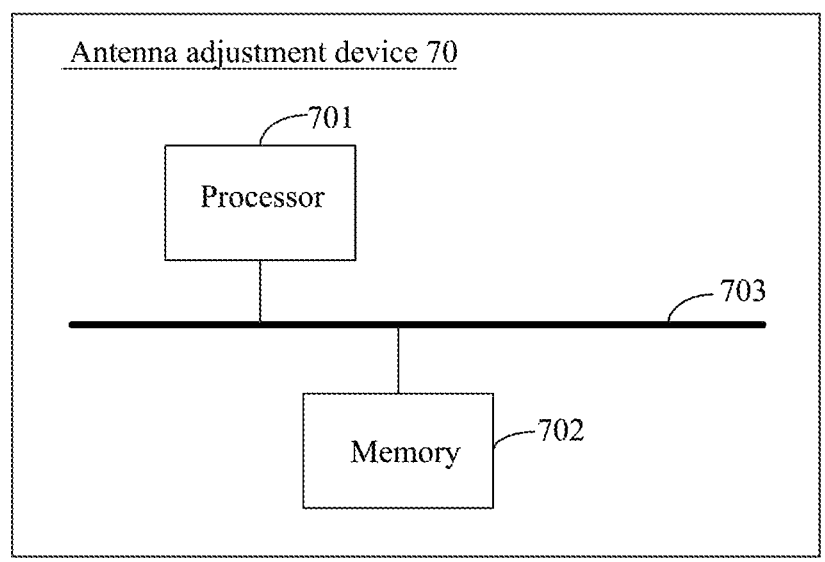
FIG. 7 is a schematic diagram of a hardware structure of an antenna adjustment device according to an embodiment of the present disclosure.

FIG. 7 is a schematic diagram of a hardware structure of an antenna adjustment apparatus according to an embodiment of the present disclosure. As shown in FIG. 7, the antenna adjustment device 70 of the present embodiment includes: a processor 701 and a memory 702; where the memory 702 is configured to store computer execution instructions; and the processor 701 is configured to execute the computer execution instructions stored in the memory to perform the steps of the antenna adjustment method in the foregoing embodiment. For details, reference may be made to the related description in the foregoing method embodiments.

In an embodiment, the memory 702 may be independent from or integrated with the processor 701.

When the memory 702 is independently disposed, the antenna adjustment device further includes a bus 703 for connecting the memory 702 and the processor 701.

An embodiment of the present disclosure further provides a computer-readable storage medium, the computer-readable storage medium is stored therein computer execution instructions, which, when executed by the processor, implement the antenna adjustment method described above.

In the several embodiments according to the present disclosure, it should be understood that the disclosed apparatus and method may be implemented in other manners. For example, the apparatus embodiments described above are merely illustrative. For example, the division of the module is only a logical function division, and there may be another division manner in actual implementation; for example, multiple modules may be combined or may be integrated into another system, or some features can be ignored or not be executed. In addition, the mutual coupling or direct coupling or communication connection shown or discussed may be an indirect coupling or communication connection through some interfaces, apparatuses or modules, and may be in an electrical form, mechanical form or in other forms.

The module described as a separate component may or may not be physically separated, and the component displayed as a module may or may not be a physical unit, that is, may be located in one place, or may be distributed to multiple network units. Some or all the modules may be selected as required, to achieve the solutions of the embodiments.

In addition, each functional module in each embodiment of the present disclosure may be integrated into one processing unit, or each module may exist physically separately, or two or more modules may be integrated into one unit. The above integrated module can be implemented in the form of hardware or in the form of hardware plus software functional units.

The integrated module described above implemented in the form of a software functional module can be stored in a computer readable storage medium. The above software functional module is stored in a storage medium and includes instructions to cause a computer device (which may be a personal computer, a server, or a network device, etc.) or a processor to perform part of the steps of the methods according to the various embodiments of the present disclosure.

It should be understood that the above processor may be a Central Processing Unit (CPU), or may be other general processors, a Digital Signal Processor (DSP), an Application Specific Integrated Circuit (ASIC), etc. The general processor may be a microprocessor, or the processor may be any conventional processor or the like. Steps of the antenna adjustment method disclosed with reference to the present disclosure may be directly implemented by a hardware processor, or may be performed by a combination of hardware and software modules in the processor.

The memory may include a high-speed random access memory (RAM) memory, and may also include a non-volatile memory (NVM), such as at least one disk memory, and may also be a U disk, a mobile hard disk, a read-only memory, a magnetic disk, an optical disk, or the like.

The bus may be an Industry Standard Architecture (ISA) bus, a Peripheral Component Interconnect (PCI) bus, or an Extended Industry Standard Architecture (EISA) bus, or the like. The bus can be divided into an address bus, a data bus, a control bus, or the like. For ease of description, the bus in the drawings of the present disclosure is not limited to only one bus or one type of bus.

The above storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that can be accessed by a general purpose or special purpose computer.

An exemplary storage medium is coupled to a processor such that the processor can read information from, and write information to, the storage medium. Of course, the storage medium may also be an integral part of the processor. The processor and the storage medium may be located in Application Specific Integrated Circuits (ASICs). Of course, the processor and the storage medium may also exist as discrete components in an electronic device or a master control device.

The person skilled in the art can understand that all or part of the steps for implementing the foregoing antenna adjustment method embodiments can be performed by a program instructing related hardware. The foregoing program may be stored in a computer-readable storage medium. When the program is executed, the steps including the foregoing antenna adjustment method embodiments are executed; and the foregoing storage medium include: various medium that can store program codes, such as a ROM, a RAM, a magnetic disk, an optical disc, or the like.

Finally, it should be noted that the above embodiments are merely illustrative of the technical solutions of the present disclosure, and are not to be taken in a limiting sense; although the present disclosure has been described in detail with reference to the above embodiments, those skilled in the art will understand that they may still modify the technical solutions described in the above embodiments, or equivalently substitute some or all of the technical features; and the modifications or substitutions do not deviate the nature of the corresponding technical solutions from the scope of the technical solutions of the embodiments of the present disclosure.

What is claimed is:

1. An antenna adjustment method, which is applied to a terminal device, wherein the terminal device is provided with an antenna, a first feed point, a wireless communication module, and at least two antenna matches, and different antenna matches correspond to different operating frequency bands, and wherein the method comprises:
    obtaining a current antenna match connected to the terminal device;
    determining a communication frequency band in which the terminal device operates;
    judging whether the communication frequency band corresponds to the current antenna match;
    determining a target antenna match corresponding to the communication frequency band from the at least two antenna matches if the communication frequency band does not correspond to the current antenna match; and
    adjusting the antenna according to the target antenna match to cause the antenna to support the communication frequency band, wherein the antenna is connected to a signal transmitting and receiving interface of the wireless communication module through the first feed point to perform signal reception or transmission;
    wherein the determining a target antenna match corresponding to the communication frequency band comprises:
    obtaining a correspondence relationship between frequency bands and antenna matches that is pre-stored in the wireless communication module; and
    determining the target antenna match corresponding to the communication frequency band from the at least two antenna matches according to the correspondence relationship.

2. The method according to claim 1, wherein the determining a communication frequency band in which the terminal device operates comprises:

obtaining a network to which the terminal device is registered; and determining a communication frequency band corresponding to the network to which the terminal device is registered according a pre-stored correspondence relationship between networks and communication frequency bands, and taking the determined communication frequency band as the communication frequency band in which the terminal device operates.

3. The method according to claim 1, wherein the judging whether the communication frequency band corresponds to the current antenna match comprises:

obtaining an operating frequency band corresponding to the current antenna match;

judging whether the operating frequency band corresponding to the current antenna match covers the communication frequency band; and determining that the communication frequency band corresponds to the current antenna match if the operating frequency band corresponding to the current antenna match covers the communication frequency band.

4. The method according to claim 1, wherein the adjusting the antenna according to the target antenna match comprises:

switching the current antenna match to the target antenna match to adjust an impedance of the antenna.

5. The method according to claim 4, wherein the terminal device is further provided with a second feed point and a radio frequency switch; the antenna is connected to the radio frequency switch through the second feed point, and the radio frequency switch is connected to the at least two antenna matches;

the switching the current antenna match to the target antenna match to adjust an impedance of the antenna comprises:

controlling the radio frequency switch through a general-purpose input/output (GPIO) of the wireless communication module to cause the second feed point to be connected to the target antenna match to adjust the impedance of the antenna.

6. An antenna adjustment apparatus, comprising: at least one processor and a memory; wherein the memory stores computer execution instructions;

the at least one processor executes the computer execution instructions stored in the memory to cause the at least one processor to execute the antenna adjustment method according to claim 1.

7. A nonvolatile memory, wherein the nonvolatile memory is stored therein computer execution instructions, which, when executed by the processor, implement the antenna adjustment method according to claim 1.

8. An antenna adjustment apparatus, which is applied to a terminal device, wherein the terminal device is provided with an antenna, a first feed point, a wireless communication module, and at least two antenna matches, and different antenna matches correspond to different operating frequency bands, and wherein the apparatus comprises: a memory, a processor, and a computer program stored on the memory and operable on the processor, wherein the processor, when running the computer program, is configured to:

obtain a current antenna match connected to the terminal device;

determine a communication frequency band in which the terminal device operates;

judge whether the communication frequency band corresponds to the current antenna match;

determine a target antenna match corresponding to the communication frequency band from the at least two antenna matches if the communication frequency band does not correspond to the current antenna match; and adjust the antenna according to the target antenna match to cause the antenna to support the communication frequency band, wherein the antenna is connected to a signal transmitting and receiving interface of the wireless communication module through the first feed point to perform signal reception or transmission;

wherein the processor is further configured to:

obtain a correspondence relationship between frequency bands and antenna matches that is pre-stored in the wireless communication module if the communication frequency band does not correspond to the current antenna match; and determine the target antenna match corresponding to the communication frequency band from the at least two antenna matches according to the correspondence relationship.

9. The apparatus according to claim 8, wherein the processor is further configured to:

obtain a network to which the terminal device is registered; and determine a communication frequency band corresponding to the network to which the terminal device is registered according a pre-stored correspondence relationship between networks and communication frequency bands, and taking the determined communication frequency band as the communication frequency band in which the terminal device operates.

10. The apparatus according to claim 8, wherein the processor is further configured to:

obtain an operating frequency band corresponding to the current antenna match;

judge whether the operating frequency band corresponding to the current antenna match covers the communication frequency band; and determine that the communication frequency band corresponds to the current antenna match if the operating frequency band corresponding to the current antenna match covers the communication frequency band.

11. The apparatus according to claim 8, wherein the processor is further configured to:

switch the current antenna match to the target antenna match to adjust an impedance of the antenna.

12. The apparatus according to claim 11, wherein the terminal device is further provided with a second feed point and a radio frequency switch; the antenna is connected to the radio frequency switch through the second feed point, and the radio frequency switch is connected to the at least two antenna matches;

the processor is further configured to:

control the radio frequency switch through a general-purpose input/output (GPIO) of the wireless communication module to cause the second feed point to be connected to the target antenna match to adjust the impedance of the antenna.

13. A terminal device, comprising: an antenna, a first feed point, a wireless communication module, at least two antenna matches and a processor; wherein different antenna matches correspond to different operating frequency bands;

the antenna is connected to a signal transmitting and receiving interface of the wireless communication module through the first feed point to perform signal reception or transmission;

the processor is configured to obtain a current antenna match connected to the terminal device; determine a communication frequency band in which the terminal device operates; judge whether the communication frequency band corresponds to the current antenna match; determine a target antenna match corresponding to the communication frequency band from the at least two antenna matches if the communication frequency band does not correspond to the current antenna match; and adjust the antenna according to the target antenna match to cause the antenna to support the communication frequency band;

wherein the wireless communication module is pre-stored with a correspondence relationship between frequency bands and antenna matches, and different antenna matches correspond to different frequency bands;

the processor determining the target antenna match corresponding to the communication frequency band comprises:

obtaining the correspondence relationship between frequency bands and antenna matches that is pre-stored in the wireless communication module; and determining the target antenna match corresponding to the communication frequency band from the at least two antenna matches according to the correspondence relationship.

14. The terminal device according to claim 13, wherein the processor determining the communication frequency band in which the terminal device operates comprises:

obtaining a network to which the terminal device is registered; and determining a communication frequency band corresponding to the network to which the terminal device is registered according a pre-stored correspondence relationship between networks and communication frequency bands, and taking the determined communication frequency band as the communication frequency band in which the terminal device operates.

15. The terminal device according to claim 13, wherein the processor judging whether the communication frequency band corresponds to the current antenna match comprises:

obtaining an operating frequency band corresponding to the current antenna match;

judging whether the operating frequency band corresponding to the current antenna match covers the communication frequency band; and determining that the communication frequency band corresponds to the current antenna match if the operating frequency band corresponding to the current antenna match covers the communication frequency band.

16. The terminal device according to claim 13, wherein the processor adjusting the antenna according to the target antenna match comprises:

switching the current antenna match to the target antenna match to adjust an impedance of the antenna.

17. The terminal device according to claim 16, further comprising: a radio frequency switch and a second feed point; wherein the antenna is connected to the radio frequency switch through the second feed point, and the radio frequency switch is connected to the at least two antenna matches;

the processor switching the current antenna match to the target antenna match to adjust an impedance of the antenna comprises:

controlling the radio frequency switch through a general-purpose input/output (GPIO) of the wireless communication module to cause the second feed point to be connected to the target antenna match to adjust the impedance of the antenna.

\* \* \* \* \*